United States Patent
Listle et al.

(10) Patent No.: US 7,809,501 B2
(45) Date of Patent: Oct. 5, 2010

(54) METHOD FOR INPUTTING LOCAL NAMES

(75) Inventors: Holger Listle, Lamspringe (DE); Stefan Lueer, Hildesheim (DE); Claus Brenner, Hannover (DE); Jens Faenger, Bernburg (DE)

(73) Assignee: Robert Bosch GmbH, Stuttgart (DE)

( * ) Notice: Subject to any disclaimer, the term of this patent is extended or adjusted under 35 U.S.C. 154(b) by 1141 days.

(21) Appl. No.: 10/513,266

(22) PCT Filed: Mar. 25, 2003

(86) PCT No.: PCT/DE03/00971
§ 371 (c)(1),
(2), (4) Date: Nov. 2, 2004

(87) PCT Pub. No.: WO03/100351
PCT Pub. Date: Dec. 4, 2003

(65) Prior Publication Data
US 2005/0182559 A1 Aug. 18, 2005

(30) Foreign Application Priority Data
May 24, 2002 (DE) .................. 102 23 121

(51) Int. Cl.
G01C 21/34 (2006.01)
G08G 1/123 (2006.01)
G01C 21/00 (2006.01)
(52) U.S. Cl. ............ 701/208; 701/200; 340/995.1; 340/995.24; 340/995.27
(58) Field of Classification Search ............ 340/995.15, 340/995.14, 995.23, 995.1, 995.17, 995.24, 340/995.27; 701/201, 200, 207, 208; 707/2; 348/231.2
See application file for complete search history.

(56) References Cited

U.S. PATENT DOCUMENTS

| | | | | |
|---|---|---|---|---|
| 5,471,392 A * | 11/1995 | Yamashita | .................. | 701/200 |
| 5,559,707 A * | 9/1996 | DeLorme et al. | ............ | 701/200 |
| 5,784,059 A * | 7/1998 | Morimoto et al. | ........... | 715/854 |
| 5,908,465 A * | 6/1999 | Ito et al. | ..................... | 701/211 |
| 6,038,508 A * | 3/2000 | Maekawa et al. | ............ | 701/207 |
| 6,144,920 A * | 11/2000 | Mikame | ..................... | 701/212 |
| 6,408,307 B1 * | 6/2002 | Semple et al. | ............ | 707/104.1 |
| 6,437,797 B1 * | 8/2002 | Ota | ........................... | 345/638 |
| 6,600,994 B1 * | 7/2003 | Polidi | ......................... | 701/209 |
| 6,934,628 B2 * | 8/2005 | Harada | ........................ | 701/211 |
| 6,950,744 B2 * | 9/2005 | Daizen | ....................... | 701/209 |
| 2002/0026289 A1 * | 2/2002 | Kuzunuki et al. | ............ | 702/150 |
| 2002/0169548 A1 * | 11/2002 | Kuroda et al. | ............... | 701/212 |

FOREIGN PATENT DOCUMENTS

| | | |
|---|---|---|
| DE | 40 33 829 | 4/1991 |
| DE | 198 40 120 | 3/2000 |
| DE | 100 12 441 | 10/2001 |

* cited by examiner

*Primary Examiner*—Thomas G Black
*Assistant Examiner*—Christine M Behncke
(74) *Attorney, Agent, or Firm*—Kenyon & Kenyon LLP

(57) ABSTRACT

A method is proposed for entering place names into a device for processing the place names, in particular into a navigation device in a vehicle, where in the case that a match of a place name is ambiguous, a graphical representation for distinguishing the respective places of the same name is displayed for selection of the particular place.

1 Claim, 3 Drawing Sheets

METHOD FOR INPUTTING LOCAL NAMES

FIELD OF THE INVENTION

The present invention is based on a method for entering place names into a device for processing the place names, in particular into a navigation device in a vehicle.

DESCRIPTION OF RELATED ART

Methods for entering place names are already known, in particular, for destination entry in navigation devices in motor vehicles. The place names are entered into the navigation device, for example, via a keyboard or by voice recognition, or selected from a list shown on a display. Sometimes, place names appear which cannot be uniquely associated with a place because several of the places stored have the same name. In this case, a user's initial entry must be followed by an ambiguity resolution procedure. For this purpose, it is known to output additional text information regarding the individual places and, for example, to display the respective county of the place in text form, for example, on an additional screen page. A user who knows only the approximate geographical position of the place, but not, for example, the associated county, may perhaps choose the wrong place based on this purely text-based selection so that subsequently, the route can therefore not be calculated correctly. For a stranger, it is generally just as difficult to associate a street with a geographical position by the name of a city district as it is to associate a city with a county. In particular, if streets of the same name are located apart from each other in different districts of the same city, or if streets of a city run through several districts, it is difficult, especially for a stranger, to make the right selection.

SUMMARY OF THE INVENTION

The method according to the present invention having the features of the independent claims and the navigation device according to the present invention have the advantage over the related art that, if a place name entered cannot be uniquely associated with a place, the ambiguity is resolved by displaying graphical information to a user which makes it easier for the user to select the actually desired destination. To this end, the system displays in each case different graphics which each characterize the associated place, and allow the user to easily distinguish between the different places of the same name. Due to the easy comprehensibility of a graphic, the selection between places of the same name can be both accelerated and made more reliable for destination entry.

Advantageous refinements and improvements of the method indicated in the main claim are made possible by the measures specified in the dependent claims.

It is also particularly advantageous to associate in each case different graphics in the form of symbols, photographs and/or photorealistic representations with a place in order to characterize the different places.

In particular, it is advantageous that a selection display is accomplished by indicating the positions of the places in a map representation for selection by the user. In this manner, the user is at least informed of the approximate geographical position of the different places of the same name. Moreover, the graphical representation on the map is easier to comprehend than purely text-based output. The user can then make a selection between the different places of the same name displayed and, in the process, is able to orient himself/herself by the geographical position of the place.

It is particularly advantageous if additional information, such as the county, the zip code, or the state of the place, is displayed in or inserted into the map representation for the position of the respective place, especially upon user request. If, in spite of the geographical position, a user is still not sure, he/she can base his/her decision on this additional information, if necessary, to ensure that he/she actually selects the desired place.

It is also advantageous to select the scale of the map representation such that at least two places of the same name are both displayed simultaneously on one map in the map representation. This allows the user to compare the geographical position of the at least two places and to make a decision between the different places without having to select another screen page or map. In this connection, it is particularly advantageous to be automatically select the scale in such a manner that the smallest available scale, i.e., the largest possible map representation, is selected so that the display is utilized as optimally as possible and the user obtains as detailed information as possible about the position of the different places. According to another specific embodiment, it is advantageous to provide for each place name a separate associated map representation in which the place is marked. This allows a list selection between the individual place names. Thus, there is no need for a special text entry indicating the place name to be selected in the map. It is advantageous for the map to be in the form of an overview map allowing the user to make a quick decision.

Moreover, after a place has been selected, it is also advantageous to offer a further subselection between individual places that are, in turn, associated with this place. In this connection, it is possible select districts of the place, streets, or facilities categorized by function such as restaurants, hotels, or gas stations.

BRIEF DESCRIPTION OF THE DRAWINGS

The present invention will be described in greater detail with reference to the following drawings wherein.

DETAILED DESCRIPTION OF THE INVENTION

The method for entering place names according to the present invention can be used for any applications, in particular, for computer-based applications. Possible methods include, for example, a method for selecting a destination to book a ticket, or the selection of a place to find out a telephone number. The method according to the present invention can be used to advantage, in particular, for selecting a destination in a navigation method for route calculation in a road network. In this connection, the method can be carried out to advantage, in particular, in a navigation device in a motor vehicle because in the vehicle, entry should be quick and clear while having only limited entry and display means available. Furthermore, in particular in the case of route planning programs, it is also possible not only to enter a destination, but also to enter a starting point in a manner according to the present invention. The method according to the present invention will be described below by the example of a navigation device integrated into a motor vehicle. First of all, "place name" will be understood to be the name of a city, township, or village. However, a "place name" can also be understood to be a general geographical or administrative name. Thus, a place name can also refer to districts, streets, special landforms, such as mountains or passes, to sights and/or special facilities, such as company offices or government department offices.

Figure 1:
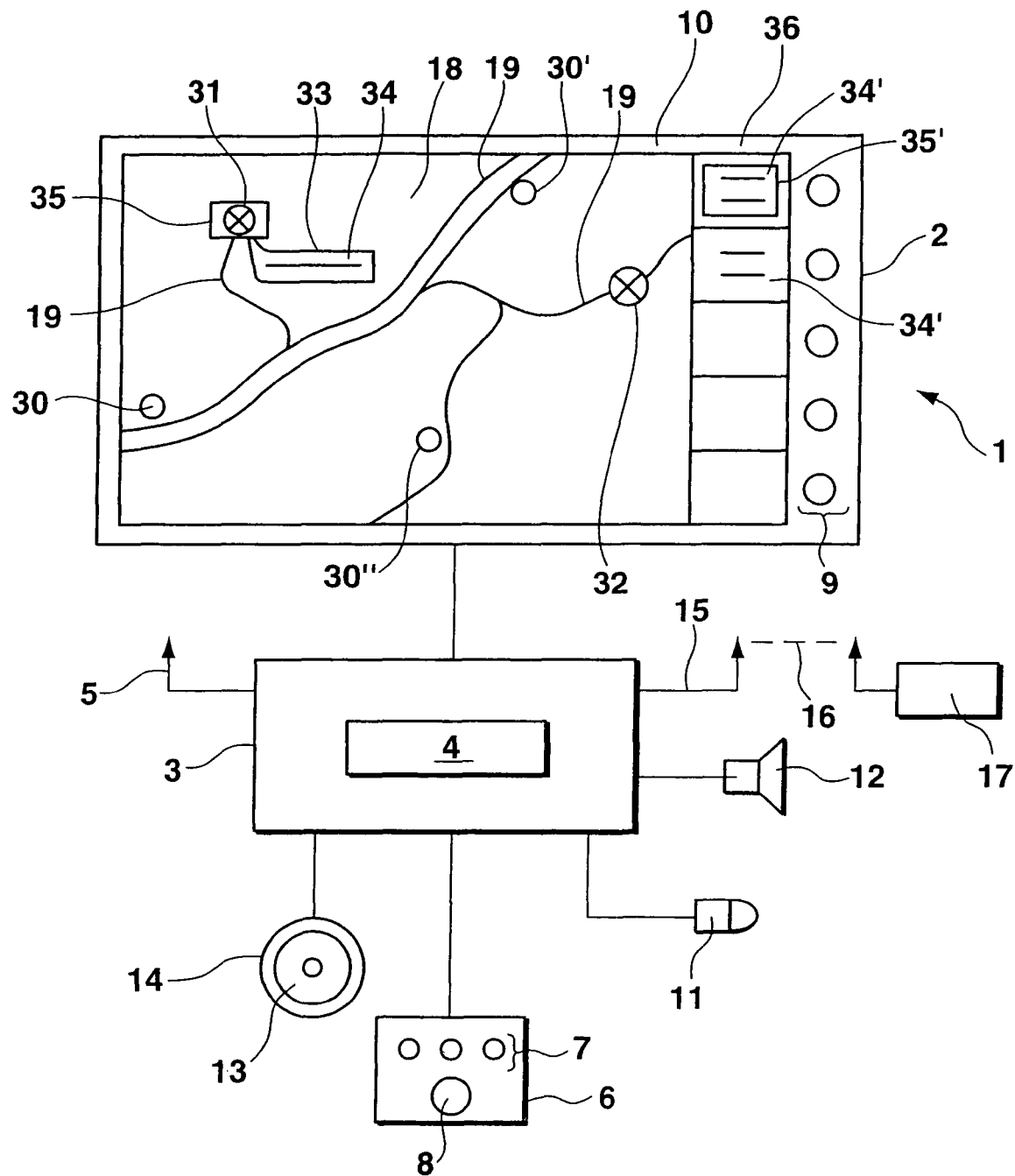
FIG. 1 shows a navigation device according to the present invention for implementing the inventive method.

FIG. 1 shows a navigation device 1 including a display unit 2 and a control unit 3, to which is connected the display unit 2. Moreover, control unit 3 is provided with a processing unit 4 which is used to control display unit 2, to calculate routes, and to process a user entry. Control unit 3 further has a locator device 5 which, via a suitable antenna, establishes radio contact with satellites of a satellite positioning system, and determines the position of the vehicle in which navigation device 1 is mounted. Moreover, control unit 3 is connected to an operator control unit 6 which is equipped with keys 7 and/or a rotary controller 8, and used by a user to operate control unit 3. Moreover, keys 9 can be provided on display unit 2 next to a display area 10. In a further exemplary embodiment, display area 10 can be designed as a touch-sensitive display in which functions shown on the display can be selected accordingly by touching the display area. Other suitable control elements can also be provided. In a preferred embodiment, control unit 3 is also connected to a microphone 11 which is used for voice control of control unit 3. Audible information, in particular, driving instructions, such as an instruction to make a turn, can be issued to the driver via a loudspeaker 12. A digital map with a street network is stored on a storage medium 13 which is inserted into an associated storage medium drive 14. Also stored on storage medium 13 are place names and the geographical positions of the places that are associated with the respective place names. In this connection, "place names" are understood to be, for example, city names, names of districts, or also street names.

Control unit 3 can access storage medium 13 via storage medium drive 14 and transmit the required information to control unit 3 for subsequent processing by processing unit 4. Moreover, control unit 3 is connectable to a data center 17 by a radio link 16 via an air interface 15. In data center 17, there may also be stored map data and/or location data as well as additional information, which can be transmitted to control unit 3 via radio link 16. In another exemplary embodiment, route calculation can also be carried out in data center 17.

A destination is entered into control unit 3 via operator control unit 6, key 9, display area 10 and/or microphone 11. Using the digital map stored, for example, on storage medium 13, processing unit 4 calculates a route from the current position of the vehicle, which is determined by locator device 5, to the destination entered.

Figure 2:
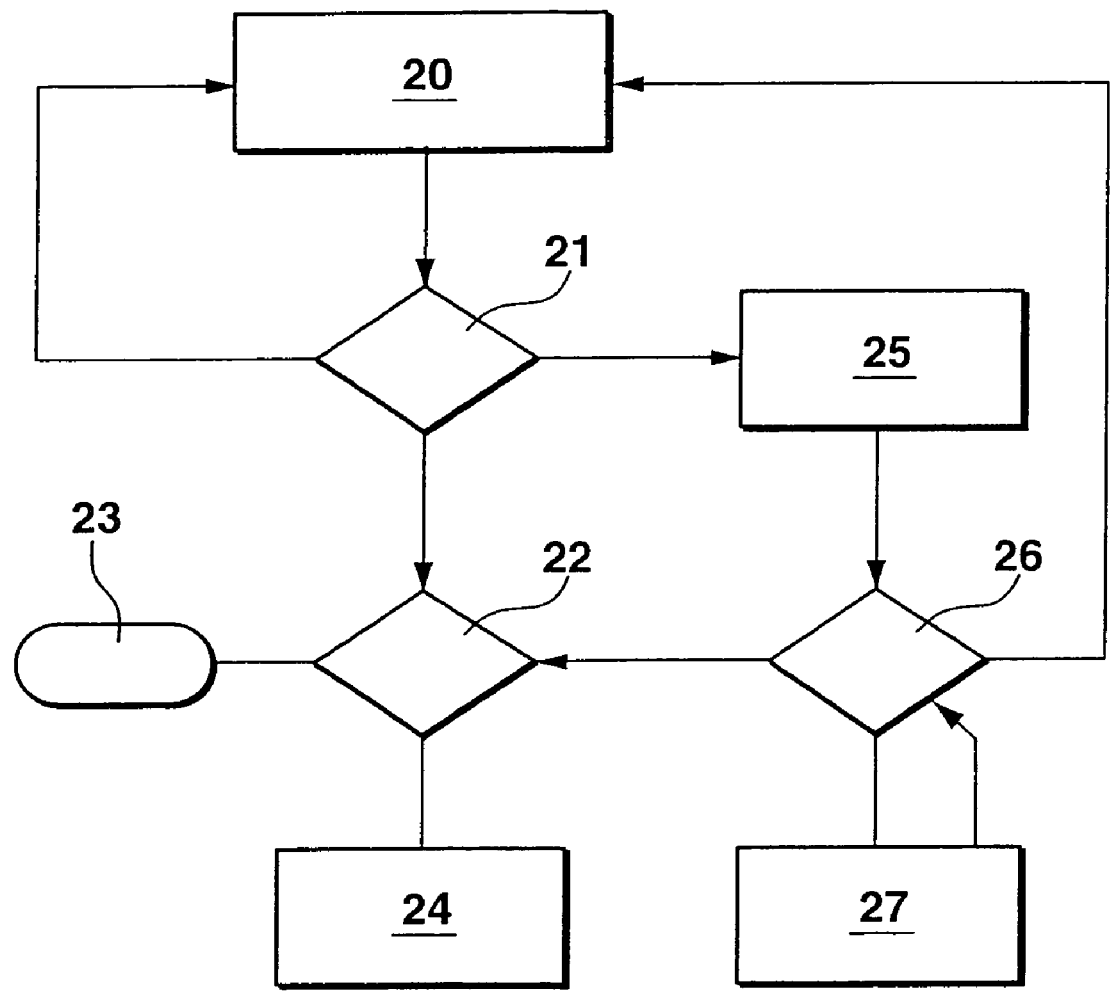
FIG. 2 shows an exemplary embodiment of a method sequence according to the present invention.

A method according to the present invention for destination entry is shown in FIG. 2. After turning on navigation device 1, a driver is prompted by a suitable output of navigation device 1 to enter a destination. The prompt can be issued via display area 10 and/or by an audible instruction via loudspeaker 12, especially during driving. Subsequently, a destination is entered into navigation device 1 in a place-name entry step 20. This can be done, for example, by voice input through microphone 11, or by selecting a sequence of characters via keys 7, or, using rotary controller 8 in conjunction with suitable character display and character selection of in display area 10. When place-name entry step 20 is completed, a branch is made to a first verification step 21 in which it is checked whether the place name has been uniquely associated with a place. If it is found that storage medium 13, which serves as a memory unit, does not contain any place name matching the entry, then the user is informed of this, and the system returns to place-name entry step 20. If it is found that there exists exactly one associated place name, then a branch is made to a second verification step 22 in which it is checked whether the desired place has parts that need to be separately selected by a user, such a individual districts, sights, restaurants, hotels, or specific streets. If the place has been uniquely identified by the preceding place-name entry, then a branch is made to a specification step 23 in which the place name entered is specified as the destination, and the route from the current vehicle position to the now specified destination is calculated. If it is found that the place has not yet been uniquely identified, a branch is made to a secondary selection 24 in which the driver is prompted to select a part of the place. The selection of a part of a place can be carried out analogously to the procedure for selecting the main place. It is also possible allow the user to select a part of the place directly from a list. If in step 21, no unique match is found for the name, then a branch is made to a first display step 25. In this case, for example, a representation as depicted in FIG. 1 is displayed in display area 10.

In the display area 10 according to FIG. 1, a map representation 18 is displayed which graphically shows the routes of various roads 19. Also plotted on the map are various places 30, 30', 30" that are located on roads 19. On the other hand, a first highlighted place 31 and a second highlighted place 32 are highlighted in map representation 18 at the respective positions of the places. The markings, which are in the form of, for example, stars or circles, are different from the other signs or symbols used to represent places in display area 10. The highlighted places 31, 32 mark the positions of places which have the same name that was previously entered by the user. The two places 31, 32 are shown in map representation 18 without further user input. In this connection, a suitable scale of the map representation 18 is selected in first display step 25 as a function of the distance between the two places. In this context, the scale is selected such that display area 10 is utilized as optimally as possible so as to obtain as high as possible a resolution of map representation 18, thus allowing both places to be displayed simultaneously. In a preferred embodiment, an additional text 34, which is schematically shown in FIG. 1 and relates to the position of first highlighted place 31, is displayed at first highlighted place 31 in a frame 33. The additional text 34 contains information about the zip code or the county of first highlighted place 31, and is also stored on storage medium 13 in association with the individual places. In addition, the marking of first highlighted place 31 is surrounded by a selection frame 35. The preset selection indicated by selection frame 35 can be confirmed, and the place name of first highlighted place 31 be entered as a new destination by making a corresponding selection, preferably using one of the keys 7. Selection frame 35 can be shifted to second highlighted place 32, preferably using rotary controller 8. In another exemplary embodiment which is not shown in FIG. 1, a selection pointer, a so-called "cursor", can be freely moved between different highlighted places using input elements. In a further exemplary embodiment, the place name and associated additional information can be displayed in further windows 36, in each case together with an associated selection marker 35'. The additional texts 34, 34' can also be displayed in windows 36. In a preferred embodiment, the windows 36 are associated with individual keys 9 on display unit 2 so that a place can first be selected by operating the respective associated key 9, and also be entered as a destination by operating the key once more. In a preferred embodiment, the additional texts 34 are shown in map representation 18 only when the respective place is to be selected for destination entry.

Generally, the entry of a destination is started by entering a city name. The place name "München" will be used by way of example. When entering the place name "München", then the cities of "München" in the counties of Amberg-Sulzbach, Elbe-Elster, München-Stadt, München-Land, Passau-Land and Weimarer Land will be displayed on the map. When selecting one of the selections on the map, the respective county name will also be indicated. Moreover, the entry method according to the present invention can also be used, for example, if several streets in a city have the same or a similar name, for example, XY Street and XY Square. In another embodiment, the entry method according to the present invention can also be used if the name entered is not a complete place name, but only a partial place name, and if, based on the preceding input, the partially entered place name cannot be uniquely matched to a stored place name. In a preferred embodiment, the position is displayed on the map only if the number of places to be displayed does not exceed a predetermined number, for example, if it is smaller than eight. A too complex display representation is thus avoided.

First display step 25 is followed by a third verification step 26 in which a request is made as to which of the selected places is to be entered as the destination. In a preferred embodiment, first a place can be selected. This selection can still be changed. Subsequently, a selected place is confirmed. Once the confirmation has been made, a branch is made to second verification-step 22. If additional information is requested, for example, by manipulating operator control unit 6, then the desired-additional information is displayed at least for the selected place in a second display step 27. Moreover, via operator control unit 6, it is also possible to indicate that none of the selected places is desired by the user. In this case, the system returns to place-name entry step 20 in which the user carries out the place name entry once more.

Figure 3:
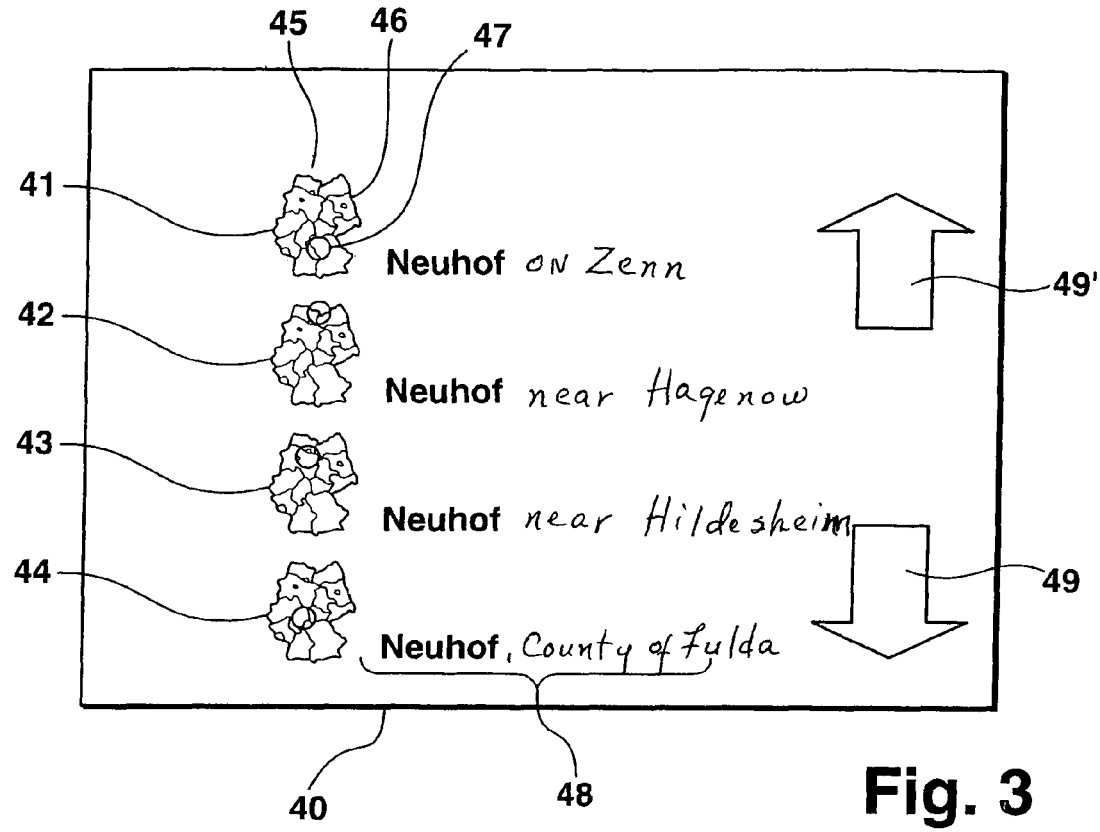
FIGS. 3 and 4 show further exemplary embodiments of a screen display of a navigation device according to the present invention.

FIG. 3 shows a further exemplary embodiment of a display representation in display area 10. In this exemplary embodiment, the driver enters the place name "Neuhof" into the navigation devices as a destination. As a result, a representation of all places of the same name is displayed to the user. Display representation 40 shows a selection of the place name "Neuhof". In this case, four different places of the name "Neuhof" are offered for selection. In display representation 40, each place is assigned a line 41, 42, 43 and 44, respectively. Plotted in a first column 45 are map representations 46 of Germany. In the exemplary embodiment chosen, boundaries of the German federal states are drawn in the map representation of Germany for improved distinguishability of the individual places. In lieu of the outline map of the Federal Republic of Germany, it is also possible to show the outline of a district of a state, or of another administrative division. For example, if the list contains the names of city districts or of streets in different city districts, then the graphics displayed for the respective names show, for example, the outline of the city, or of the respective city district. Similarly, it is also possible to mark house numbers in a graphical representation of streets in an analogous manner.

A circle 47 marks an area in which is located the respective associated place; the place names each being entered in a second column 48 next to the respective associated map representations 41, 42, 43, 44. In this connection, the place is preferably located in the center of the respective circle. In lieu of a circle 47, it is also possible to make cross marks or similar notations on map 46. For the sake of clarity of the drawing, in each case only one map and one circle are provided with reference numerals. According to a preferred embodiment, each of the place names in column 48 is entered along with additional text regarding the region to which the place belongs: "Neuhof on Zenn", "Neuhof near Hagnow", "Neuhof near Hildesheim" and "Neuhof, County of Fulda". In a further embodiment, which is not shown in the drawing, it is also possible to enter only the place name in column 48. In this case, a user determines the position of the place based on the association with the displayed maps.

Also shown in the display area are arrows 49, 49' for selecting other places named "Neuhof", or to select additional functions of the navigation device. In this connection, the specification of a place as the destination is preferably carried out by making a selection using operator control unit 6; a selection marker being shifted to one of the indicated places, and the selected place being confirmed using one of the keys 7 or a push function of rotary controller 8.

The map representations that are displayed in display area 40 along with the various destinations may be quite small so that, in particular, small differences in position cannot be seen due to the limited resolution. In this regard, the user is preferably given the option of viewing an enlargement of the respective map representation upon request via operator control unit 6. Such a display can be invoked, for example, by selecting the respective map representation in display area 40 with a display frame or display pointer. Then, the enlarged map representation covers the other, smaller map representations at least temporarily and at least temporarily partially.

In a further exemplary embodiment which is not shown in the drawing, the driver selects the street named "Hildesheimer Strasse" in Hannover as the destination. The result displayed to the user is a list of city districts traversed by this street. The user knows these city districts by their names, but does not know where they are located within Hannover. However, the user does know that the desired destination must be located south of the city center. The user can find the desired district by using the overview map. In another example, the street named "Bergstrasse", which appears at various sites in the City of Wetzlar, is drawn at the respective positions on the city map in a first embodiment. In a second embodiment, small representations of the urban area in which the position of the respective "Bergstrasse" segment is in each case highlighted are offered for selection in the form of a list in accordance with the representation in FIG. 3.

Figure 4:
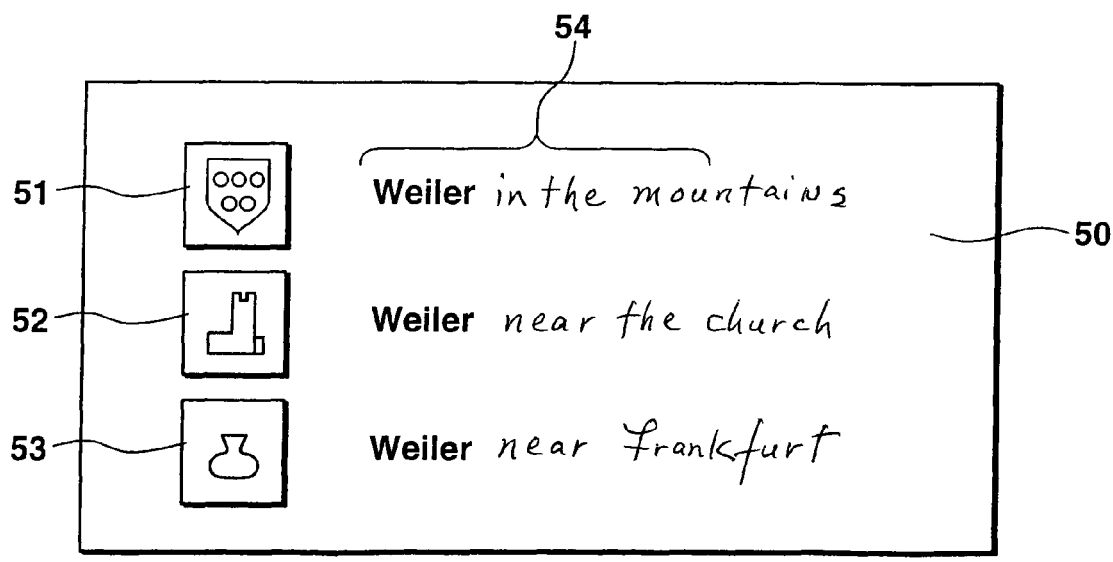

Additionally, in yet another embodiment, other graphics for distinguishing the different places of the same name can be used instead or in addition. One way to do this is, for example, to display pictures of the cities or city districts next to the respective place names; the pictures showing, for example, prominent features. In this connection, it is also possible to use symbolic, abstract representations, such as a symbolic representation of a building, a tower, a lake, a waterway, a park, or of a fountain. It is also possible to insert, for example, the coats of arms of cities. In this regard, FIG. 4 shows a display area 50 in which various places named "Weiler" are offered for selection. In a preferred embodiment, an additional text is given in a text column for each place "Weiler". Furthermore, suitable graphics 51, 52, 53 are given for each place. The graphics can be displayed in display area 50 as graphical, symbolic representations, or as photographic or at least photorealistic representations.

In the first line, a city coat of arms 51 is given for the first place "Weiler in the mountains", the coat of arms allowing the place to be identified at least by a user who knows this place. In the second line, a pictorial representation 52 of a sight, here a ruin, is displayed for the second place, the pictorial representation of the sight being intended to allow identification. Shown in the third line is a symbol 53, here in the form of a clay jug which represents regional craftsmanship and is intended to attract attention to a corresponding local and well-known product. On the basis of the displayed symbols, a user can now make a selection between the various places that have the same name "Weiler".

What is claimed is:

1. A navigation device for a vehicle, comprising:
   a display unit, an operator control unit, a processing unit, and a memory unit;
   wherein the operator control unit is configured to enable a proper noun city name or a district name of a city to be entered into the navigation device and to be compared by the processing unit to proper noun city names or district name of a city stored in the memory unit, wherein for a case in which at least two cities or districts having the name entered are stored in the memory unit, unique graphics for identifying each of the cities or districts associated with the entered city name or district name of a city are stored in the memory unit and are displayable on the display unit for selection via the operator control unit, and wherein the unique graphics identifying each of the cities or districts associated with the entered city name or a district name of a city are outlines of the corresponding cities or districts.

* * * * *